Jan. 8, 1957　　　M. D. BIBLE　　　2,776,633
PLANT SETTER
Filed May 12, 1952.　　　3 Sheets-Sheet 1
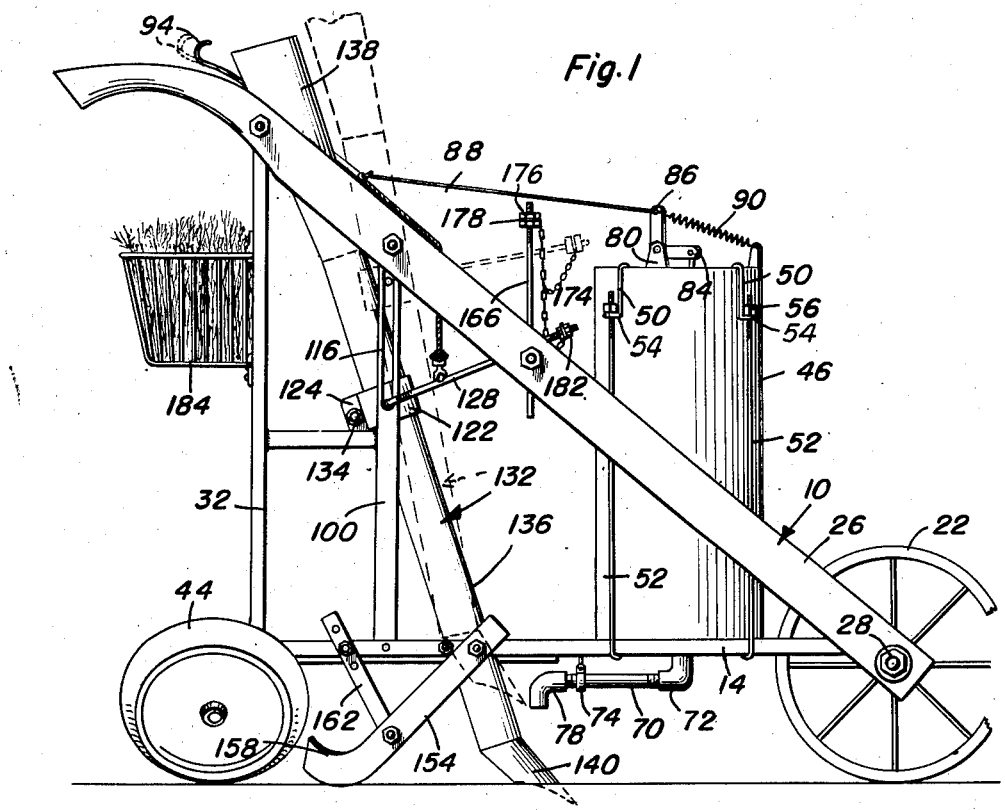
Fig. 1
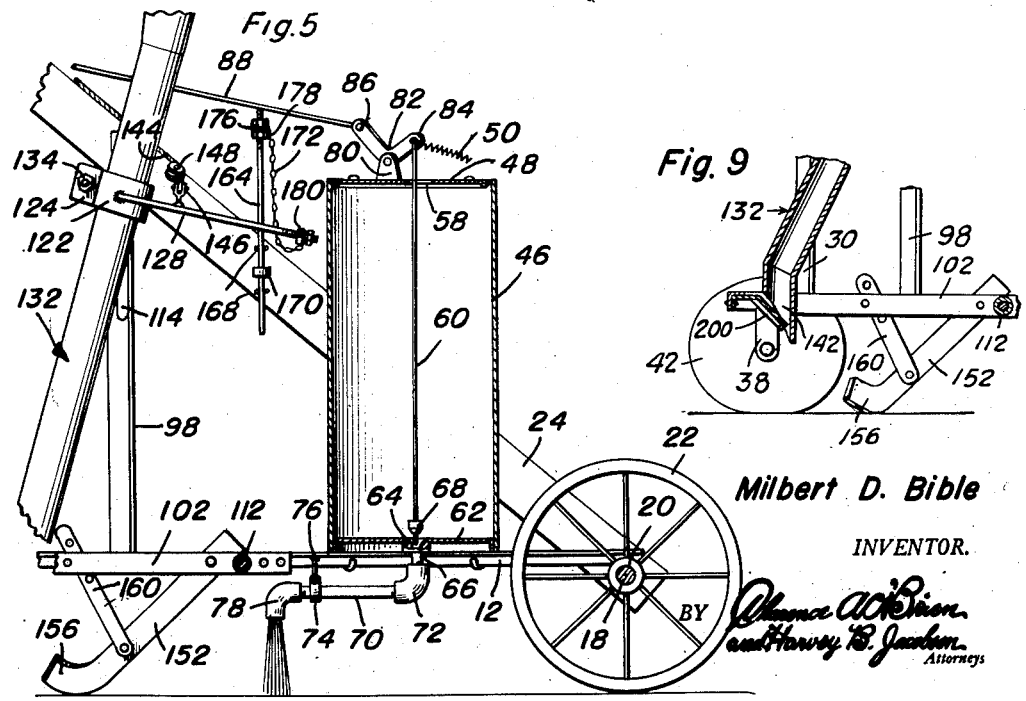
Fig. 5
Fig. 9
Milbert D. Bible
INVENTOR.

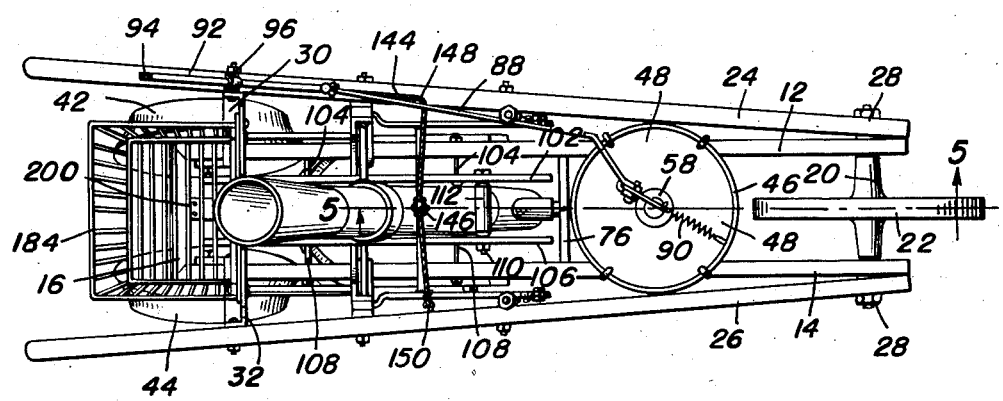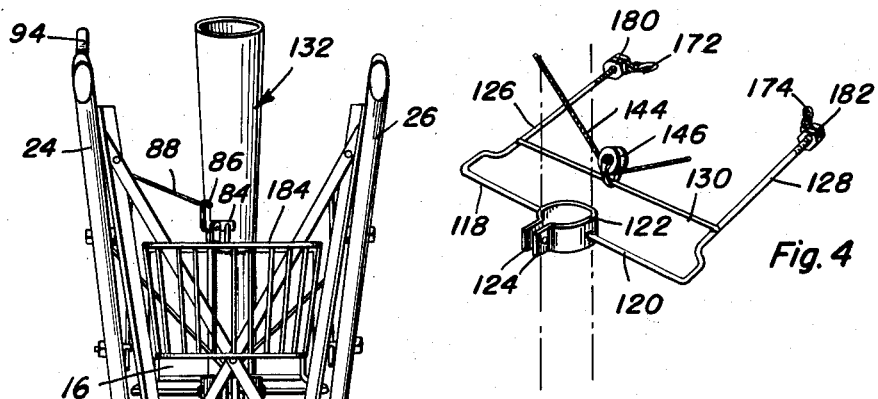

Jan. 8, 1957  M. D. BIBLE  2,776,633
PLANT SETTER
Filed May 12, 1952 3 Sheets-Sheet 3
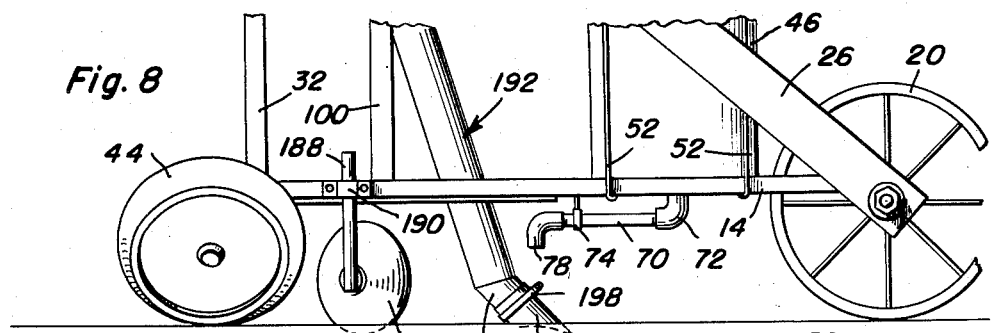
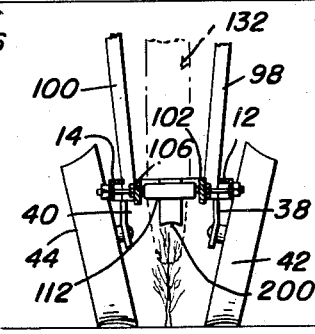
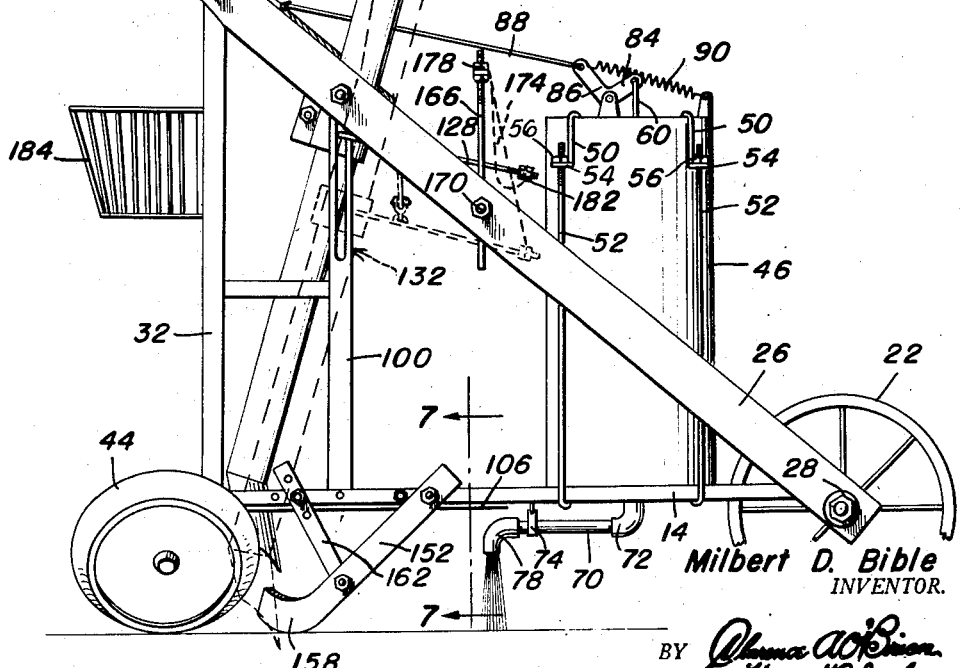
Milbert D. Bible
INVENTOR.

United States Patent Office 2,776,633
Patented Jan. 8, 1957

2,776,633

PLANT SETTER

Milbert D. Bible, Mosheim, Tenn.

Application May 12, 1952, Serial No. 287,402

2 Claims. (Cl. 111—2)

This invention relates to farm implements in general, and more specifically to a plant setter for transplanting small plants.

The primary object of this invention is to provide an improved plant setter which may be utilized by one man to transplant small plants such as tobacco plants, cabbage plants, and tomato plants.

Another object of this invention is to provide an improved plant setter which is provided with means for breaking the ground and guiding a plant into the opening made thereby, said means being adapted to protect a plant throughout its passage beneath the plant setter whereby it is firmly set in the ground by ground compacting means carried by the plant setter without possibility of injuring the plant.

Another object of this invention is to provide an improved plant setter which is provided with a water source, said water source being provided with means for controlling the discharge of water onto the ground, means semi-automatically controlling said valve whereby water is discharged immediately prior to the engagement of plant setting means with the ground at the point where the water was applied.

Another object of this invention is to provide an improved plant setter which includes a plant tube having an opening at the upper end thereof for receiving plants and ground engaging means at the lower end thereof for engaging the ground within a furrow to position the plant being inserted.

Another object of this invention is to provide an improved plant setter which is mounted on a wheeled frame and is of relatively simple construction whereby it may be economically manufactured, said plant setter being intended for use by one person and eliminates the back breaking task of hand planting.

A further object of this invention is to provide an improved mounting means for mounting a plant tube on a supporting frame, said mounting means permitting the selectively engaging of the lower end of the plant tube with the ground and permitting the same to remain in engagement with the ground while the supporting frame is moved longitudinally, said mounting means including a stop means for limiting the rearward pivoting of the lower end of the plant tube and causing the elevation thereof in order to move the same out of engagement with the ground, operating means connected with said mounting means for moving the plant tube to an initial ground engaging position.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 1 is a side elevational view of the plant setter, which is the subject of this invention, and shows the general relationship of the various elements thereof, the plant tube being illustrated in its initial ground engaging position by solid lines and in its raised position prior to moving into engagement with the ground by dotted lines;

Figure 2 is a top plan view of the plant setter of Figure 1 and shows the general construction of the means for mounting the plant tube on the supporting frame;

Figure 3 is a rear elevational view of the plant setter of Figure 1 and shows the relationship of ground compacting wheels with respect to the lower end of the plant tube;

Figure 4 is a fragmentary perspective view of means for supporting the plant tube, the plant tube being shown by broken lines;

Figure 5 is a fragmentary longitudinal vertical sectional view taken substantially upon the plane indicated by the section line 5—5 of Figure 2 and shows the general construction of the means for semi-automatically discharging water from the water supply tank;

Figure 6 is a side elevational view of the plant setter and is similar to Figure 1 with the exception that the tube has moved to its rearmost position and raised out of engagement with the ground, the rearmost position of the plant tube prior to its raising from the ground being illustrated by dotted lines;

Figure 7 is a fragmentary transverse vertical sectional view taken substantially upon the plane indicated by the section line 7—7 of Figure 6 and shows the position of a plant just planted by the plant setter, the plant tube being illustrated by broken lines;

Figure 8 is a side elevational view of the lower portion of the plant setter of Figure 1 and shows a modified form of soil raker, the lower end of the plant tube also being modified in that it is received with a removable ground engaging portion; and Figure 9 is a fragmentary sectional view taken substantially upon the plane indicated by the section line 9—9 of Figure 3 and shows the specific relationship between the scraper and the plant tube in a scraping position.

Similar characters of reference designate similar or identical elements and portions throughout the specification and throughout the different views of the drawings.

Referring now to the drawings in detail, it will be seen that the plant setter, which is the subject of this invention, includes a supporting frame which is referred to in general by the reference numeral 10. The supporting frame includes a generally rectangular base which is formed by a pair of longitudinally extending spaced parallel frame rails 12 and 14. The rear ends of the frame rails 12 and 14 are connected together by a transversely extending frame member 16 and at their forward ends by a transversely extending shaft 18. Mounted on the shaft 18 intermediate its ends and positioned between the frame rails 12 and 14 is a hub 20 of a wheel 22.

Secured to the forward ends of the frame rails 12 and 14 by the shaft 18 is a pair of upwardly and rearwardly sloping handles 24 and 26. The handles 24 and 26 are secured against the front ends of the frame rails 12 and 14, respectively, by nuts 28 threadedly engaged on the outer ends of the shaft 18.

Connected at their lower ends to the frame rails 12 and 14 adjacent the transverse frame member 16 are substantially vertically extending rear supports 30 and 32, respectively. The supports 30 and 32 are angle members and have inwardly extending flanges to provide spacing means in a manner which will be described in more detail hereinafter. Inasmuch as the handles 24 and 26 diverge rearwardly, the upper ends of the supports 30 and 32, which are connected to the handles 24 and 26, respectively, at their upper ends, have their upper ends diverging outwardly. Extending between the supports 30 and 32 are diagonal bars 34 and 36 which are connected together intermediate their ends to form an X-bracing.

In order that the base of the supporting frame 10 may remain substantially horizontal to the ground, the frame rails 12 and 14 are provided adjacent the rear ends thereof with downwardly projecting arms 38 and 40 (Fig. 3) to which are connected ground compacting wheels 42 and 44, respectively, for rotation. It will be noted that the bottoms of the ground compacting wheels 42 and 44 converge inwardly so as to be closely adjacent each other.

Mounted at the forward end of the supporting frame 10 adjacent the wheel 22 is a vertically extending cylindrical water supply tank 46 which is supported by the frame rails 12 and 14. The upper end of the water supply tank 46 is closed by a top 48 disposed slightly below the upper edge of the side walls of the tank 46. The water supply tank 46 is clamped to the base of the supporting frame 10 by a plurality of pairs of short and long J-shaped fasteners 50 and 52, respectively. It will be noted that the long J-shaped fasteners 52 have lower end hooked around either the frame rail 12 or the frame rail 14 and extend vertically along the side of the water supply tank 46. Associated with each long J-shaped fastener 52 is one of the short J-shaped fasteners 50. The short J-shaped fastener 50 is inverted and has its hooked end hooked over the upper edge of the water supply tank 46. The lower end of each inverted short J-shaped fastener 50 is provided with an eye 54 which receives the upper end of the associated long J-shaped fastener 52. The water supply tank 46 is tightly clamped against the frame rails 12 and 14 by nuts 56 threadedly engaged on the upper ends of the long J-shaped fasteners 52 and engaging the upper surface of the eyes 54 of the short J-shaped fasteners 50.

Referring now to Figure 5 in particular, it will be seen that the top 48 of the water supply tank is provided with a centrally located opening 58 therethrough and through which extends a valve operating rod 60. The bottom 62 of the water supply tank 46 is provided with a centrally located opening 64 which communicates the interior of the water supply tank 46 with a discharge pipe 66. The upper portion of the opening 64 in the bottom 62 is tapered to form a valve seat, and is normally closed by a valve member 68 mounted on a valve operating rod 60 adjacent the lower end thereof.

Extending rearwardly below the base of the supporting frame 10 is a pipe 70 which is connected to the water supply pipe 66 by an L-shaped fitting 72. The rear end of the pipe 70 is supported by a collar 74 which is suspended from a transversely extending rod 76 whose ends are secured to the frame rails 12 and 14. Carried by the rear end of the pipe 70 is a second L-shaped fitting 78 whose free end faces downwardly and forms a discharge opening.

Secured to the cover 48 of the tank 46 and extending upwardly therefrom adjacent the opening 58 is a support arm 80 which has pivotally connected thereto adjacent the upper end thereof a crank 82. The crank 82 has a first arm 84 which is connected to the upper end of the valve operating rod 60 and a second arm 86 which is connected to the forward end of an actuating rod 88. In order that the valve 68 may normally remain in a closed position, a tension spring 90 is connected to the first arm 80 to urge the valve operating rod 60 downwardly within the tank 46. As is best illustrated in Figure 2, the handle 24 has mounted on the upper edge thereof adjacent its rear end an operating member 92 which is slidably mounted thereon and is provided with a hooked rear end 94 (Fig. 6) for moving the same longitudinally thereof. The operating member 92 is retained on the upper edge of the handle 24 by a clamp 96 in which it is slidably mounted. The forward end of the operating member 92 is connected to the rear end of the actuating rod 88 for moving the valve 68 to an open position.

Extending upwardly from the frame rails 12 and 14 adjacent the supports 30 and 32 are support bars 98 and 100, respectively, whose upper ends are rigidly secured to the handles 24 and 26, respectively. The support bars 98 and 100 are angular in cross-section and each is provided with a flange extending normally to its associated frame rail and projecting inwardly therefrom. As is best illustrated in Figure 2, secured to the frame rail 12 in spaced parallel relation thereto is a first elongated guide member 102. The elongated guide member 102 is secured to the frame rail 12 by a pair of elongated fasteners 104 and spaced from the frame rail 12 by the lower ends of the support 30 and the support member 98. In spaced parallel relation to the frame rail 14 is a second elongated guide member 106 which is connected to the frame rail 14 by a pair of elongated fasteners 108 and spaced therefrom by the lower ends of the support 32 and the support member 100. Extending between the guide members 102 and 106 adjacent the forward ends thereof is a shaft 110 on which is rotatably mounted a roller 112. The purpose of the roller 112 will be explained in detail hereinafter.

The support members 98 and 100 are provided with elongated slots 114 and 116, respectively, in the upper portions thereof. Mounted within the elongated slots 114 and 116 for both pivotal and vertical movement are transverse rods 118 and 120, respectively. As is best illustrated in Figure 4, the transverse rods 118 and 120 are in transverse alignment and secured to opposite sides of a circular clamp 122, the circular clamp 122 being split to provide outwardly extending wing flanges 124 for clamping purposes. Secured to the outer ends of the transverse rods 118 and 120 are forwardly extending arms 126 and 128, respectively, the forward end portions of the arms being inwardly offset from those portions connected to the ends of the transverse rods 118 and 120. Extending between the arms 126 and 128 and secured thereto adjacent the transverse rods 118 and 120 is a transverse rod 130 which is in parallel relation to the transverse rods 118 and 120.

As is best illustrated in Figures 1 and 5, an elongated plant tube, which is referred to in general by the reference numeral 132 is disposed within the circular clamp 122 and adjustably positioned therein by a fastener 134 extending between and clamping together the wing portions 124. The plant tube is provided with a straight cylindrical portion 136 intermediate its ends and terminates in a funnel portion 138 at the upper end thereof. The lower end of the plant tube 132 is in the form of a conical portion 140 which is disposed at an angle to the central straight portion 136 and extends slightly forwardly therefrom. The underside of the lower end of the conical portion 140 is cut away to form a plant passageway 142 as well as a front chisel point. It will be understood that the front chisel point is adapted to engage in the ground and provide an opening for a small plant therein so that a plant passing through the plant opening 142 may be received within the ground. In order that the plant tube 132 may be raised to the position illustrated by dotted lines in Figure 1, a flexible member 144 is entrained around a pulley 146 carried by the transverse rod 130 connected to the arms 128 and 126. One end of the flexible member 144 is connected to the end of the operating member 92 as is the end of the actuating rod 88 and the flexible member 144 passes from the end of the operating member 92 over a guide pulley 148 mounted on the upper edge of the handle 24 in transverse alignment with the pulley 146. The other end of the flexible member 144 is connected to an eye bolt 150 carried by the handle 26 in transverse alignment with both the pulley 146 and the guide pulley 148. When the operating member 92 is moved rearwardly, the plant tube 132 and its associated mounting means are raised to a position indicated by dotted lines in Figure 1 and inasmuch as the pulley 146 becomes the pivot point of the means supporting the plant tube 132, the plant tube 132 assumes the sloping position indicated in dotted lines.

It will be noted that when the plant tube 132 is in the elevated position indicated by dotted lines in Figure 1, the actuating rod 88 is moved rearwardly with the result that the valve member 68 is lifted from the valve seat 64 and water is discharged through the fitting 78 onto the ground. The operating member 92 is then released and the plant tube 132 moves downwardly due to the force of gravity and assumes the position indicated by solid lines in Figure 1 with the chisel point thereof digging into the ground. It will be understood that simultaneously with the release of the operating member 92 a plant is dropped into the plant tube 132 through its funnel end 138 and the same passes through the conical lower end 140 of the plant tube and out of the opening 142 in the lower portion thereof and into the furrow formed in the ground at the point determined by the chisel point.

The plant setter is then moved forwardly with the chisel point of the plant tube 132 remaining in contact with the ground with the result that the transverse rods 118 and 120 momentarily move upwardly in their respective slots 114 and 116 and the arms 126 and 128 are pivoted downwardly. In order that the disturbed earth resulting from the formation of a hole therein may be packed back around a plant disposed within the earth, the base of the supporting frame 10 is provided with earth rakes 152 and 154 connected at their upper ends to the frame rails 12 and 14, respectively, and having their lower rearwardly disposed portions engaging the upper surface of the ground. It will be understood that the lower ends 156 and 158 of the earth rakes 152 and 154, respectively, are inwardly turned to move loose earth towards the conical lower end 140 of the plant tube 132 as the plant setter is moved forwardly. In order that the earth rakes 152 and 154 may be properly positioned with respect to the ground, the lower rear portions thereof are supported by diagonal brackets 160 and 162, respectively, which are adjustably connected to the respective frame rails 12 and 14.

Referring now to Figures 1, 5 and 6, it will be seen that the handles 24 and 26 have extending upwardly therefrom vertical rods 164 and 166, respectively, which are positioned adjacent the rear of the water supply tank 46. The vertically extending rods 164 and 166 are disposed between vertically aligned pairs of pins 168 and adjustably clamped therebetween by eye bolts 170. The upper ends of the vertical rods 164 and 166 are threaded and have adjustably connected to the upper ends thereof chains 172 and 174, respectively, the chains being secured by nuts 176 and 178, respectively, threadedly engaged on the upper ends of their respective vertical rods 164 and 166. The other ends of the chains 172 and 174 are adjustably connected to the forward ends of the arms 126 and 128, respectively, by respective nuts 180 and 182 threadedly engaged thereon.

Referring now to Figure 6 in particular, it will be seen that as the plant setter continues to move forwardly the transverse rods 118 and 120 begin to move downwardly in the respective slots 114 and 116 and the ends of the arms 126 and 128 continue to pivot downwardly and rearwardly away from the ends of their respective vertical rods 164 and 166. When the plant tube 132 reaches the position indicated by dotted lines in Figure 6, the chains 172 and 174 become taut and prevent further pivoting of the lower end of the plant tube 132 with the result that it is lifted so that only the chisel point remains in contact with the ground.

When the plant tube 132 reaches the upper end of its travel due to engagement with the ground, the operator of the plant setter then pulls the operating member 92 rearwardly with the result that the plant tube 132 is raised to the position indicated by solid lines of Figure 6. The plant tube 132 then pivots to the position indicated by dotted lines in Figure 1 and a cycle is completed. The plant placed in the ground then has the ground around it tamped in place by the earth compacting wheels 44 disposed at the rear of the supporting frame 10.

In order that a convenient supply of plants may be available, a wire basket 184 is secured to the rear of the vertical supports 30 and 32 and extends therebetween adjacent the upper ends thereof. The wire basket 184 is intended to contain a plurality of plants and the water supply tank 46 is so designed that it contains sufficient water for the plants contained within the wire basket 184. It will be understood that while the water supply tank 46 and the wire basket 184 may be of any size, it is preferred that they be of such size whereby sufficient water and plants may be carried for completing at least one row.

Referring now to Figure 8 in particular, it will be seen that the earth rakes 152 and 154 have been replaced by rearwardly converging disks 186 which are supported by vertically extending shanks 188 adjustably clamped to their respective frame rails 12 and 14 by clamps 190. Also shown is a modified form of the plant tube which is referred to in general by the reference numeral 192, and differs from the plant tube 132 in that it is provided with a conical lower end portion 194 which is cut off and has removably clamped thereon a ground engaging end 196, the ground engaging end 196 being clamped to the conical lower end 194 by a clamp 198. The remainder of the plant setter remains unchanged and the operation of the same is the same as that set forth above.

During the normal operation of the plant setter, the conical shaped lower end 140 of the plant tube 132 will have a tendency to have its plant passing opening 142 closed by dirt forced therein. In order to prevent the plant passing opening 142 from being clogged, there is secured to and extending forwardly from the transverse frame member 16 a pointed scraper 200, the scraper being best illustrated in Figure 7. As the lower end of the plant tube 132 moves outwardly out of engagement with the earth at the rear end of its travel, the scraper 200 is disposed within the opening 142 and due to the vertical movement thereof dirt is removed from the opening.

The normal position of the plant tube 132 is that illustrated in dotted lines in Figure 6. The plant tube 132 is then elevated to its solid line position of Figure 6 by pulling upon the operating member 92 which at the same time results in the opening of the valve 68 so that a desired amount of water will be sprayed onto the ground at the point the next plant to be set is to be positioned. Once the plant tube 132 has been raised to its elevated position of Figure 6, it will swing by gravity to its dotted line position of Figure 1. At this time, one of the plants to be set is then inserted in the upper end of the plant tube 132 and the operating member 92 is moved forwardly. This releases the plant tube 132 with the result that it drops down due to gravity and the conical portion 140 penetrates the ground thereby providing an opening for the plant which is being set. As the plant setter continues to move forwardly, the lower end of the plant tube 132 will remain in the ground protecting the plant which has just been set until it reaches the dotted line position of Figure 6 once again. It is pointed out at this time that as the plant tube 132 is moved from its dotted line position of Figure 6 to the solid line position of that same figure, the scraper 200 will enter into the open lower end of the plant tube 132 and remove any such dirt which may have accumulated therein.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A plant setter comprising a supporting frame, a plant tube, mounting means carried by said supporting frame engaging said plant tube and permitting movement of said plant tube with respect to said supporting frame, said plant tube being open at its upper end for receiving plants, the lower end of said plant tube being provided with ground penetrating means, said mounting means including fixed spaced upright members each having an elongated slot in the upper end thereof, a transversely extending rod having end portions disposed in said elongated slots, a collar carried by said rod receiving said plant tube, and means on said rod for limiting pivoting of said plant tube and the lifting thereof.

2. A plant setter comprising a supporting frame, a plant tube, mounting means carried by said supporting frame engaging said plant tube and permitting movement of said plant tube with respect to said supporting frame, said plant tube being open at its upper end for receiving plants, the lower end of said plant tube being provided with ground engaging means, said mounting means including spaced upright members having elongated slots in the upper ends thereof, a transversely extending rod having end portions disposed in said elongated slots, a collar carried by said rod receiving said plant tube, said rod being provided with forwardly extending arms having stop means connected thereto for limiting the downwardly pivoting of the forward ends of said arms.

References Cited in the file of this patent

UNITED STATES PATENTS

| | | |
|---|---|---|
| 516,745 | Pitt | Mar. 20, 1894 |
| 719,995 | Carroll | Feb. 10, 1903 |
| 1,333,339 | Puckett | Mar. 9, 1920 |
| 1,657,944 | Stocker et al. | Jan. 31, 1928 |
| 1,878,412 | Lamiell | Sept. 20, 1932 |
| 2,486,462 | Carelock | Nov. 1, 1949 |

FOREIGN PATENTS

| | | |
|---|---|---|
| 56,608 | Germany | May 15, 1891 |
| 419,105 | Germany | Sept. 28, 1925 |
| 480,386 | Germany | Aug. 1, 1929 |
| 205,825 | Great Britain | Jan. 15, 1925 |